(12) United States Patent
Hirao et al.

(10) Patent No.: US 8,310,820 B2
(45) Date of Patent: Nov. 13, 2012

(54) ELECTRONIC DEVICE

(75) Inventors: Hiroaki Hirao, Ome (JP); Takayuki Arisaka, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 50 days.

(21) Appl. No.: 12/908,766

(22) Filed: Oct. 20, 2010

(65) Prior Publication Data
US 2011/0128683 A1 Jun. 2, 2011

(30) Foreign Application Priority Data
Nov. 30, 2009 (JP) ................................ 2009-272693

(51) Int. Cl.
H05K 5/00 (2006.01)
H05K 7/00 (2006.01)
G09G 5/00 (2006.01)
H04M 1/00 (2006.01)

(52) U.S. Cl. ......... 361/679.01; 361/679.02; 361/679.55; 361/679.56; 361/679.57; 361/679.58; 345/169; 345/184; 455/575.1

(58) Field of Classification Search ............. 361/679.01, 361/679.02, 679.08, 679.09, 679.3, 679.55–679.59; 345/184, 169; 455/575.1
See application file for complete search history.

(56) References Cited

U.S. PATENT DOCUMENTS

| 7,755,884 | B2 | 7/2010 | Horiuchi et al. | |
| 7,817,093 | B2 | 10/2010 | Agata et al. | |
| 7,907,399 | B2 * | 3/2011 | Kim et al. | 361/679.55 |
| 2001/0001978 | A1 | 5/2001 | Hosoi et al. | |
| 2006/0077629 | A1 | 4/2006 | Shiraishi | |
| 2006/0221264 | A1 * | 10/2006 | Ogawa et al. | 348/794 |
| 2008/0232058 | A1 * | 9/2008 | Horiuchi et al. | 361/683 |
| 2008/0238788 | A1 | 10/2008 | Agata et al. | |
| 2009/0103257 | A1 * | 4/2009 | Maeda et al. | 361/679.27 |
| 2009/0296325 | A1 * | 12/2009 | Morimoto et al. | 361/679.01 |
| 2011/0128683 | A1 | 6/2011 | Hirao et al. | |

FOREIGN PATENT DOCUMENTS

| JP | U H02-8739 | 1/1987 |
| JP | H07-246450 | 9/1995 |
| JP | 2000-183572 | 6/2000 |
| JP | 2000-197958 | 7/2000 |
| JP | 2006-106618 | 4/2006 |
| JP | 2008-234100 | 10/2008 |
| JP | 2008-244963 | 10/2008 |
| JP | 2011-119299 | 6/2011 |

OTHER PUBLICATIONS

Information Sheet in 1 page.
Notice Reasons for Rejection mailed by the Japan Patent Office on Oct. 4, 2011 in Japanese patent app. No. 2011-177040 in 6 pages.

* cited by examiner

*Primary Examiner* — Jayprakash N Gandhi
*Assistant Examiner* — Jerry Wu
(74) *Attorney, Agent, or Firm* — Knobbe, Martens, Olson and Bear, LLP

(57) ABSTRACT

According to one embodiment, an electronic device includes a housing including an exterior cover, a first rib integrated with an inner wall surface of the exterior cover facing the inside of the housing and arranged to define a plurality of first sections therein, a second rib integrated with the inner wall surface and the first rib as one unit and arranged to define a plurality of second sections therein, a plurality of projection portions projecting from the inner wall surface and each integrated with the inner wall surface and located within a respective one of the plurality of first sections, and third ribs connecting the first rib and the projection portions, respectively, and being continuous to the second ribs, respectively.

16 Claims, 8 Drawing Sheets

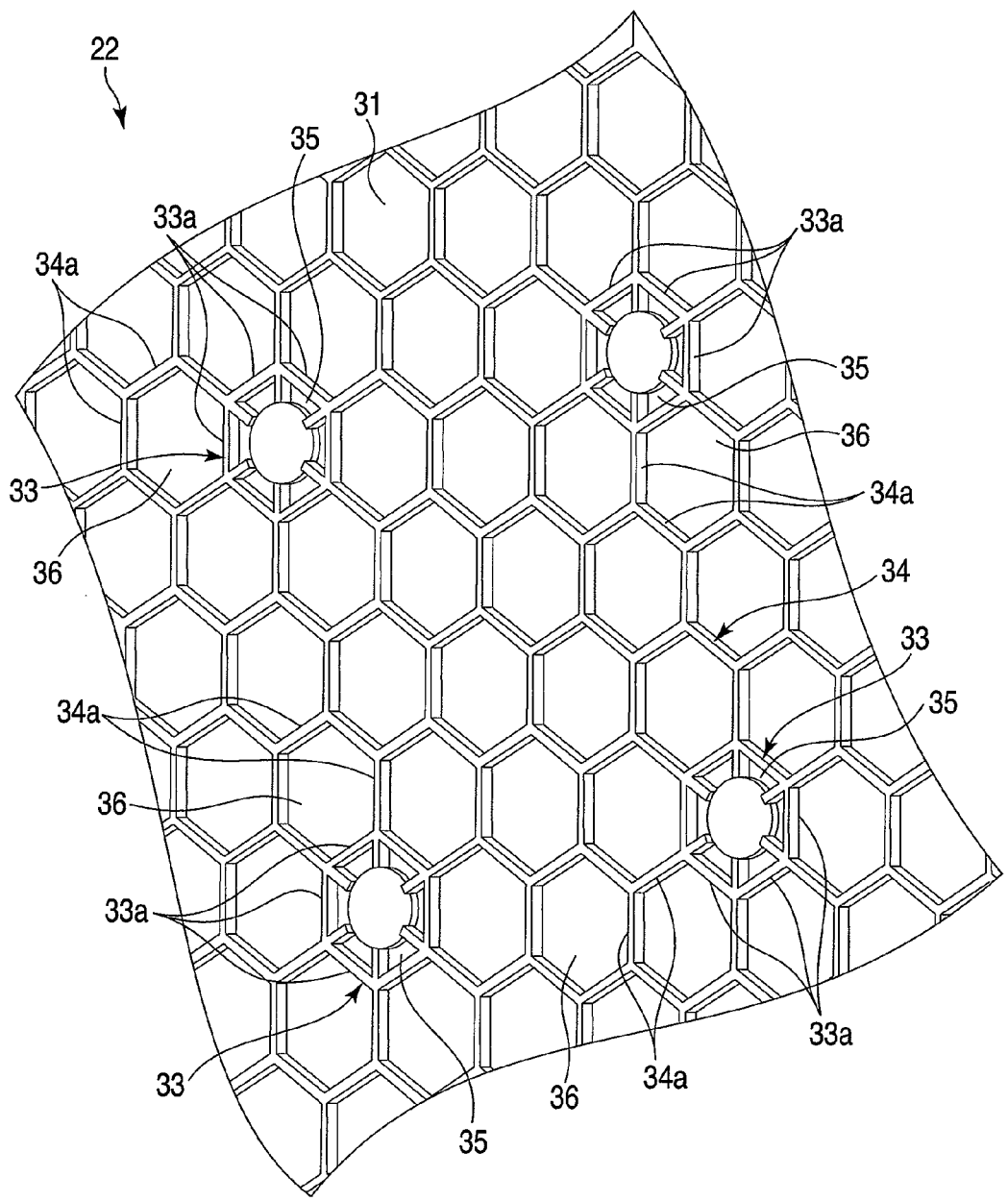
F I G. 3

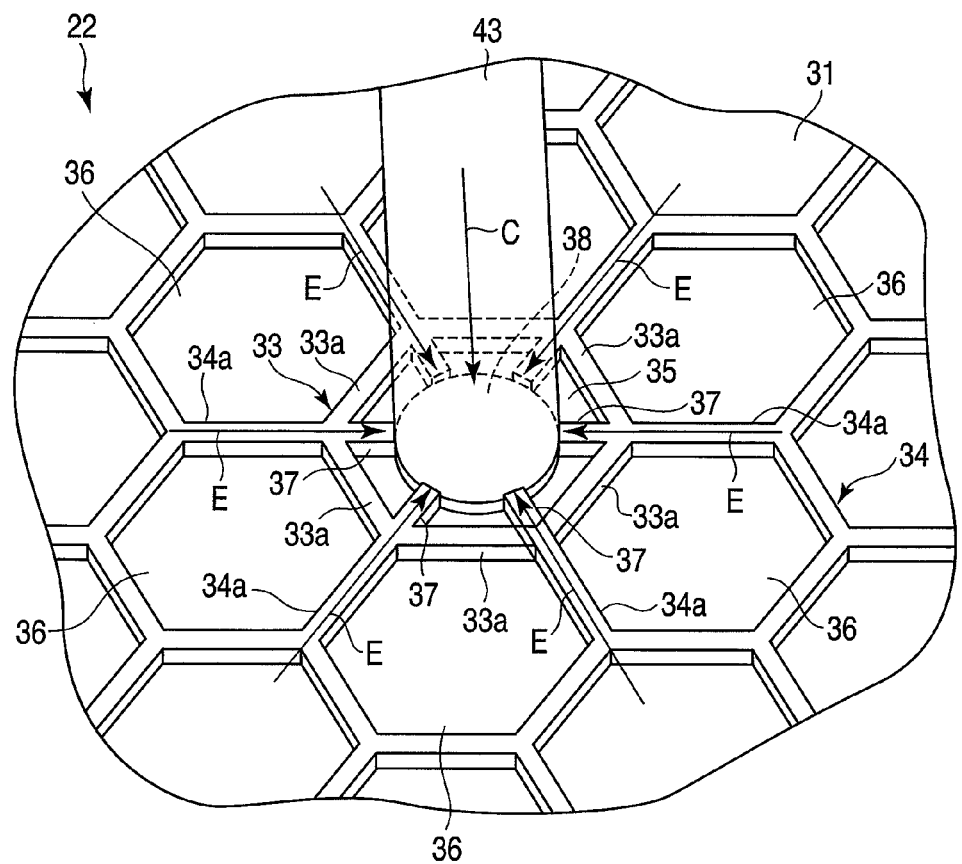
F I G. 7

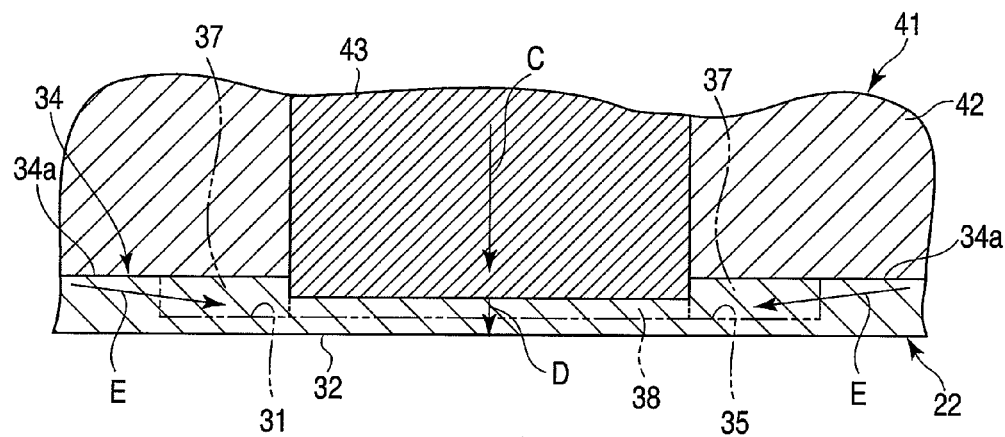
F I G. 8
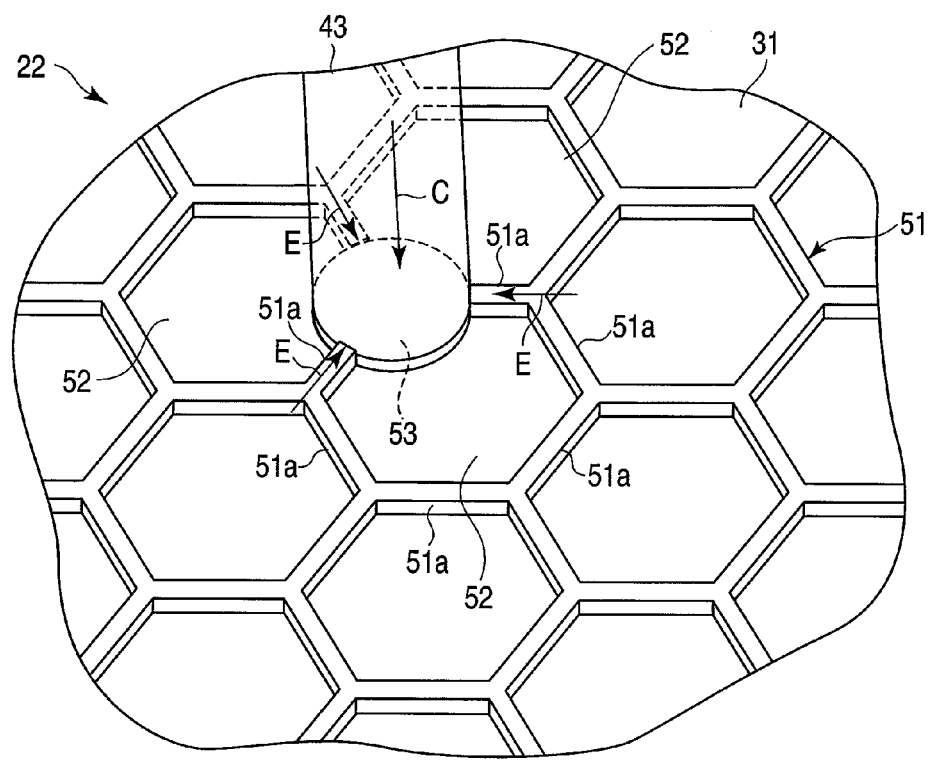
F I G. 9

ELECTRONIC DEVICE

CROSS-REFERENCE TO RELATED APPLICATIONS

This application is based upon and claims the benefit of priority from Japanese Patent Application No. 2009-272693, filed Nov. 30, 2009; the entire contents of which are incorporated herein by reference.

FIELD

Embodiments described herein relate generally to an electronic device equipped with an exterior cover in which ribs are provided to improve the stiffness of the cover.

BACKGROUND

Thinning and reducing weight are demand of electronic devices such as portable computers for easy carrying. On the other hand, portable electronic devices of this kind may be affected by a force applied from outside, for example, when being carried out in a bag.

For this reason, there is a demand that the housing of a portable electronic device should have a high stiffness in addition to thinness and lightness in weight. In particular, the exterior cover which covers the display module from the back needs to have a sufficient stiffness since the liquid crystal display panel to be built in the display module is mechanically weak.

For example, Jpn. Pat. Appln. KOKAI Publication No. 2008-234100 discloses that ribs of the so-called honeycomb structure are provided an inner side of a housing. It is known that the honeycomb structure has a high mechanical strength per unit volume. Therefore, by providing a rib of a honeycomb structure, it is possible to form a thin, light and highly stiff housing.

By providing integrating a rib of a honeycomb structure to the exterior cover of a display module as one unit, the exterior cover can be formed thin and light in weight. Further, the exterior cover can be used also as a decorative cover exposing to outside. In this manner, the exterior cover can be made further thin and light in weight. The exterior cover can be manufactured by molding a metal such as magnesium by die-casting.

However, if the exterior cover includes a rib of the honeycomb structure, the exterior cover tightly attaches to the metal mold when molding. Therefore, a large resistance is involved when the exterior cover is removed from the metal mold. When the resistance becomes excessively large, the exterior cover may be deformed while the cover is being removed from the metal mold with a push-out pin as the pin pushes the cover.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 3 is an exemplary enlarged perspective view showing the exterior cover shown in FIG. 2;

FIG. 7 is an exemplary perspective view showing the state in which the exterior cover shown in FIG. 1 is being pushed with a push-out pin;

FIG. 8 is an exemplary cross sectional view showing the exterior cover and the die-casting device taken along the line F8-F8 in FIG. 4; and FIG. 9 is an exemplary perspective view showing the state in which an exterior cover according to the second embodiment is being pushed with a push-out pin.

DETAILED DESCRIPTION

Various embodiments will be described hereinafter with reference to the accompanying drawings.

In general, according to one embodiment, an electronic device includes a housing including an exterior cover, a first rib integrated with an inner wall surface of the exterior cover facing the inside of the housing and arranged to define a plurality of first sections therein, a second rib integrated with the inner wall surface and the first rib as one unit and arranged to define a plurality of second sections therein, a plurality of projection portions projecting from the inner wall surface and each integrated with the inner wall surface and located within a respective one of the plurality of first sections, and third ribs connecting the first rib and the projection portions, respectively, and being continuous to the second ribs, respectively.

The first embodiment of the present invention will now be described with reference to FIGS. 1 through 8.

Figure 1:
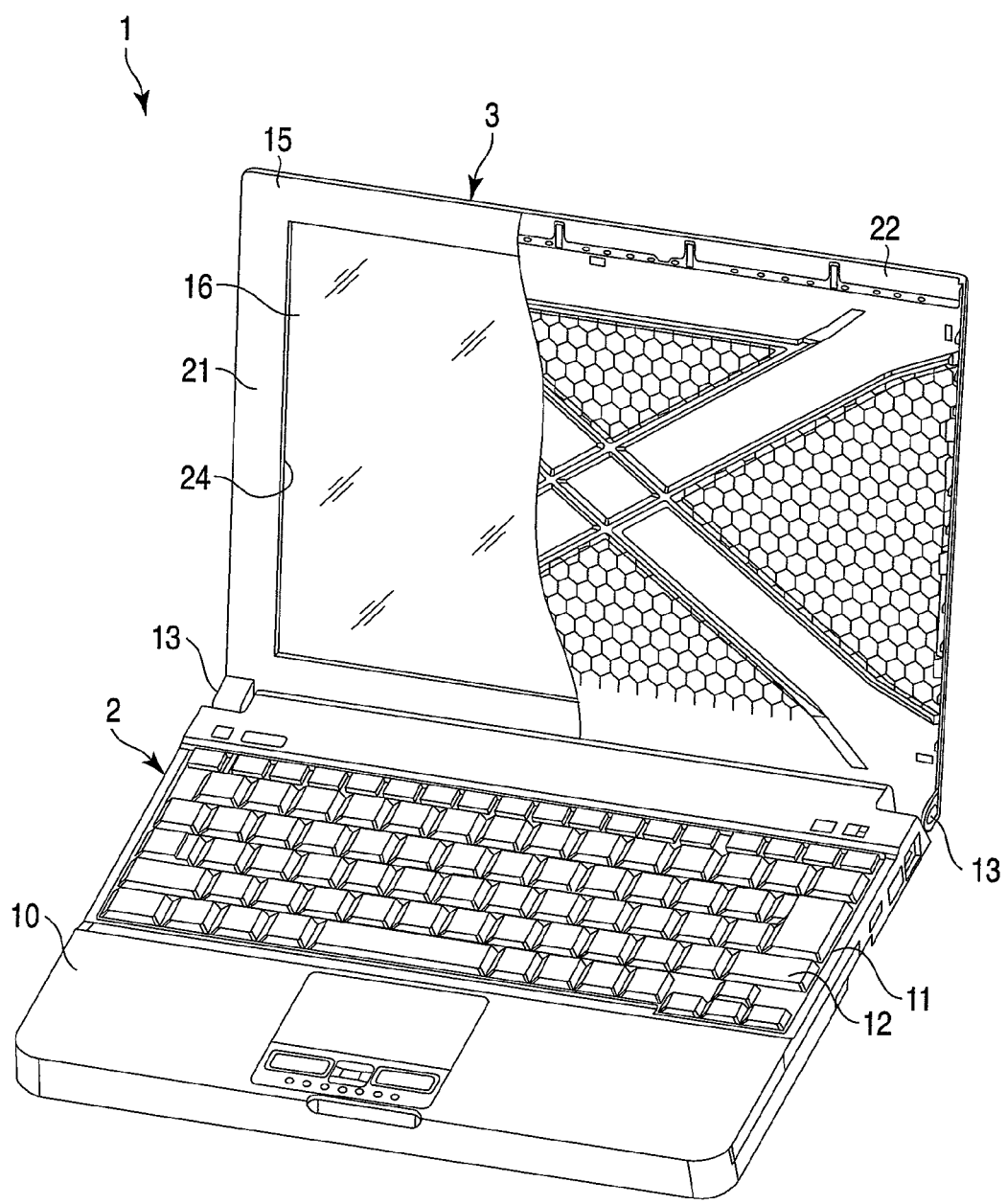
FIG. 1 is an exemplary partially cut-away perspective view showing a portable computer according to the first embodiment.

FIG. 1 is a perspective view showing a portable computer 1, which is an example of the electronic device. The portable computer 1 includes a main body 2 of the computer and a display module 3.

The main body 2 of the computer includes a main housing 10 having a shape of a flat box. A keyboard mount portion 11 is formed on the upper surface of the main housing 10. A keyboard 12 is supported on the keyboard mount portion 11.

The display module 3 is jointed to a rear end of the main body 2 via a pair of hinge portions 13. The display module 3 is made pivotable between a closed position and an open position around the hinge portions 13 as axis.

In the closed position, the display module 3 is lied on the main body 2 of the computer, whereas in the open position, the module 3 stands upright from the rear end of the main body 2.

The display module 3 includes a display housing 15 having a flat box shape, and a liquid crystal display panel 16 housed in the display housing 15. The display housing 15 is an example of the housing. The display housing 15 includes an interior cover 21 and an exterior cover 22.

The interior cover 21 constitutes a front surface of the display housing 15, and it faces the keyboard 12 when the display module 3 is in the closed position. The interior cover 21 is provided with an opening 24 opened towards the front surface of the display housing 15. The opening 24 exposes the liquid crystal display panel 16 to the outside of the display module 3.

As shown in FIG. 1, the exterior cover 22 constitutes a rear surface of the display housing 15, and it covers the liquid crystal display panel 16 from its back. The exterior cover 22 includes an inner wall surface 31 facing the inside of the display housing 15 and a decorative surface 32 (shown in FIG. 5) located on an opposite side to the inner wall surface 31. The decorative surface 32 is exposed towards the outside of the display housing 15.

The exterior cover 22 is formed by molding, for example, a magnesium alloy with a die-casting device. The exterior cover 22 may be formed of, not only a magnesium alloy but also some other metal material such as an aluminum alloy.

Figure 2:
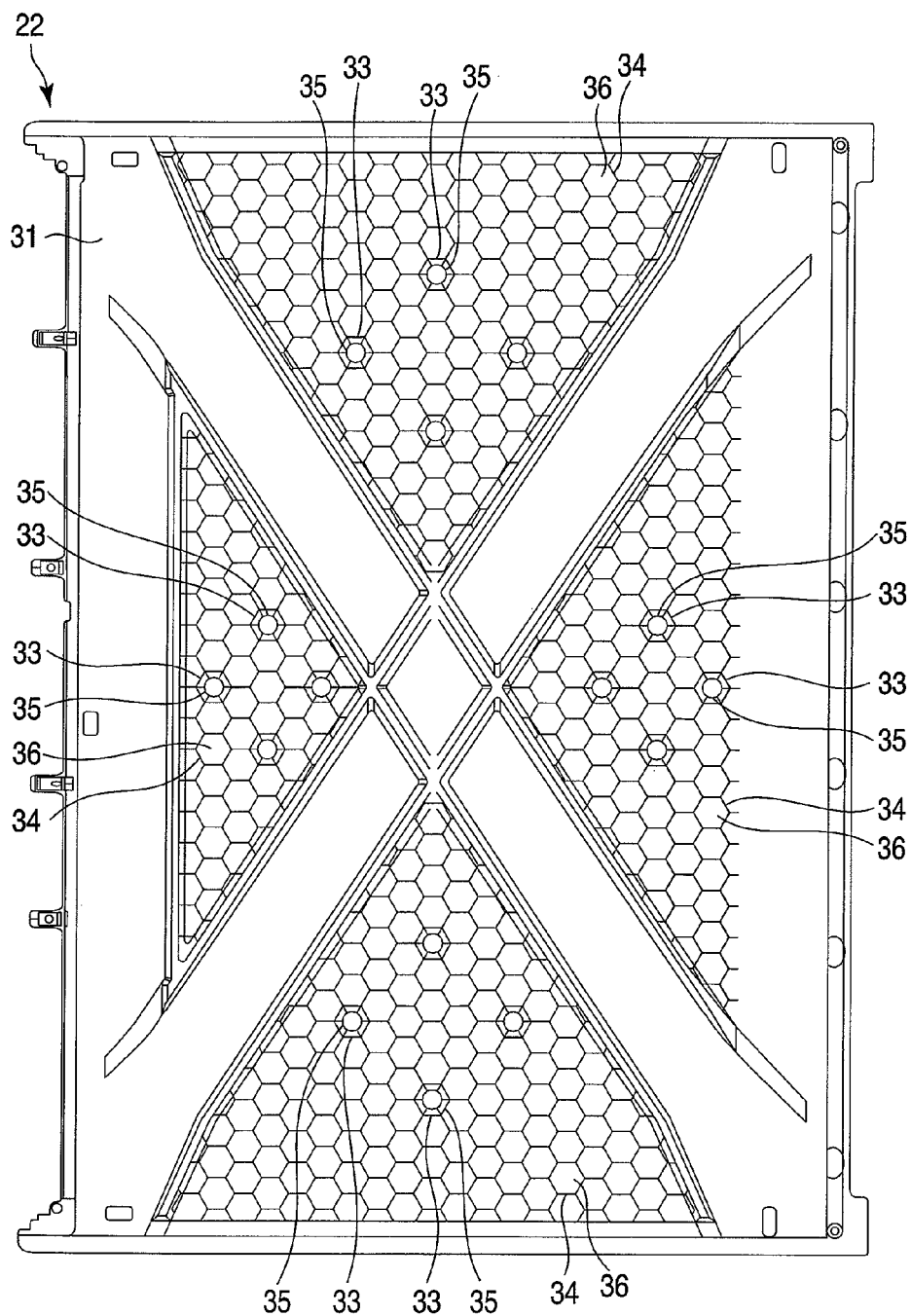
FIG. 2 is an exemplary plan view showing the exterior cover shown in FIG. 1.

FIG. 2 is a plan view showing the exterior cover 22. As shown in FIG. 2, a first rib 33 is integrated with the inner wall surface 31 as one unit. The first rib 33 includes a plurality of first frame parts 33a.

The first rib 33 is arranged to define a plurality of first sections 35. Each of the first sections 35 is formed to have substantially an equilateral hexagonal shape by three frame parts 33a facing each other. Each of the first sections 35 is a region pushed by the push-out pin 43, which will be later explained, when molding the exterior cover 22.

Further, a second rib 34 is integrated with the inner wall surface 31 and the first rib 33 as one unit. The second rib 34 includes a plurality of second frame parts 34a.

The second rib 34 is arranged to define a plurality of second sections 36. Each of the second sections 26 is formed to have substantially an equilateral hexagonal shape by three frame parts 34a facing each other. The second sections are regions defined separately from the first sections 36.

As shown in FIG. 2, the first rib 33 and the second rib 34 collaborate together to form the so-called honeycomb structure. It should be noted here that the first rib 33 serves also as the second rib 34, and defines the second sections 36 adjacent to the first sections 35, respectively.

FIG. 3 is a partially enlarged perspective view of the exterior cover 22. As can be seen in FIG. 3, each of the first sections 35 is surrounded by the second sections 36. The number of the first sections 35 is less than the number of the second sections 36.

Figure 4:
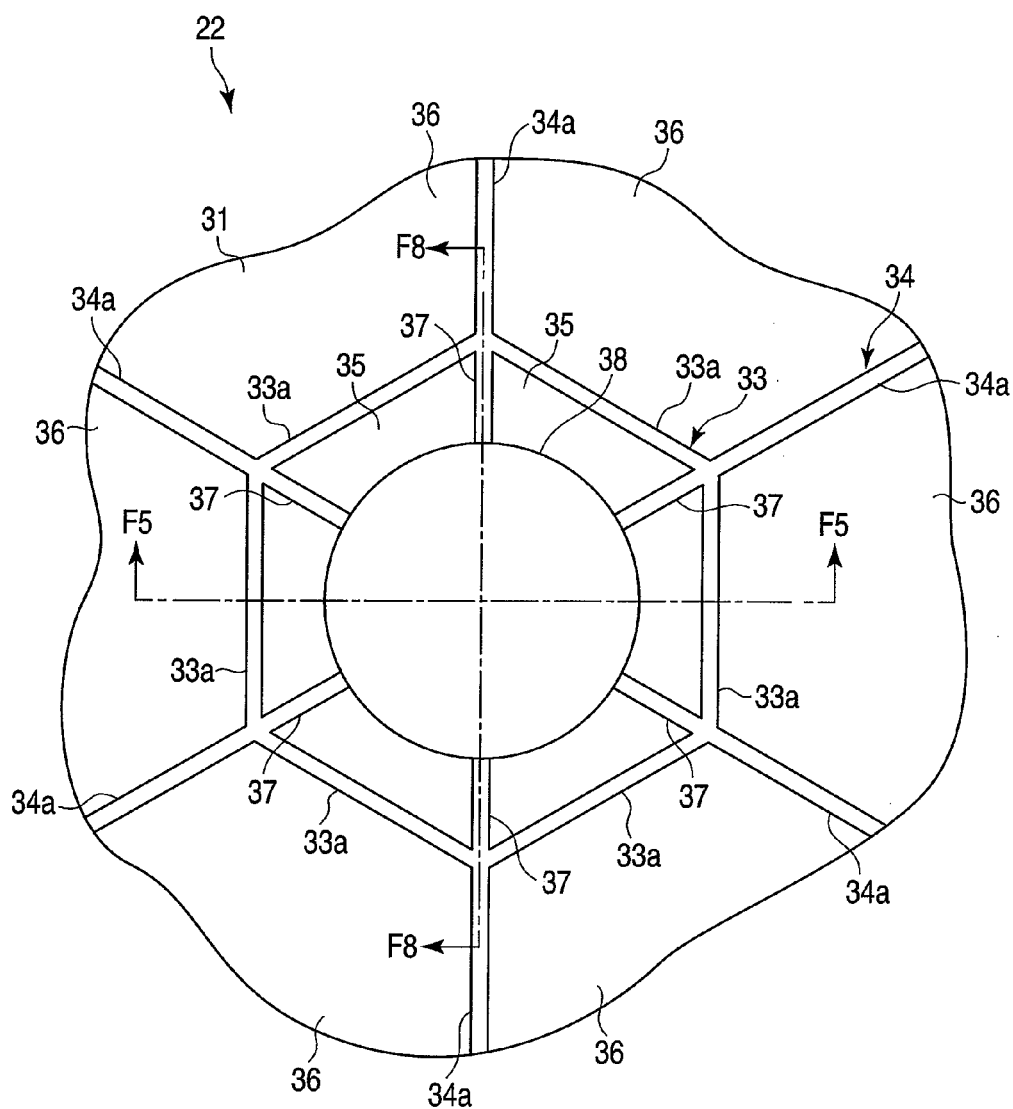
FIG. 4 is an exemplary enlarged plan view showing the first section shown in FIG. 3.

Next, with reference to FIGS. 4 and 5, the first sections 35 will now be explained in detail. FIG. 4 is an enlarged plan view showing the first section 35. For each of the first sections 35, a plurality of third ribs 37 and a projection portion 38 are provided.

The projection portion 38 is situated at the central portion of the first section 35, and it projects from the inner wall surface 31. The projection portion 38 is formed to have a circular cylindrical shape and integrated with the inner wall surface 31 as one unit. The projection portion 38 is a portion which receives the push-out pin 43, which will be later explained.

The third ribs 37 each serve as a joint connection between the first rib 33 which define the first section 35 and the projection portion 38. As shown in FIG. 4, the third ribs 37 are arranged radially from the projection portion 38 towards the corners of the first section 35. In other words, the third ribs 37 extend radially towards the first rib 33.

The corners of the first ribs 33 which define the first section 35 are formed continuous to the respective second ribs 34. The third ribs 37 each are formed linearly continuous to the respective second ribs 34 continuing to the respective first ribs 33.

Figure 5:
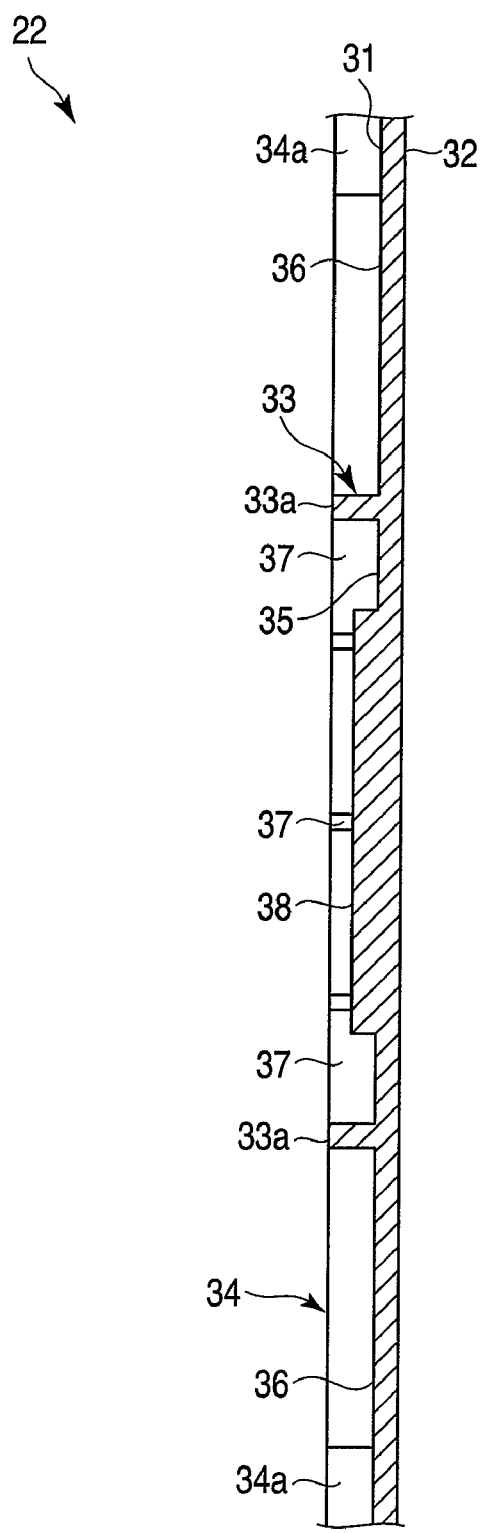
FIG. 5 is an exemplary cross sectional view taken along the line F5-F5 in FIG. 4.

FIG. 5 is a cross sectional view of the exterior cover 22 taken along the line F5-F5 in FIG. 4. The heights of the first to third ribs 33, 34 and 37 projecting from the inner wall surface 31 are equal to each other. As shown in FIG. 5, the height of the projection portion 38 is lower than the height of the first to third ribs 33, 34 and 37. For example, the height of the projection portion 38 is a half of the height of the first to third ribs 33, 34 and 37.

Figure 6:
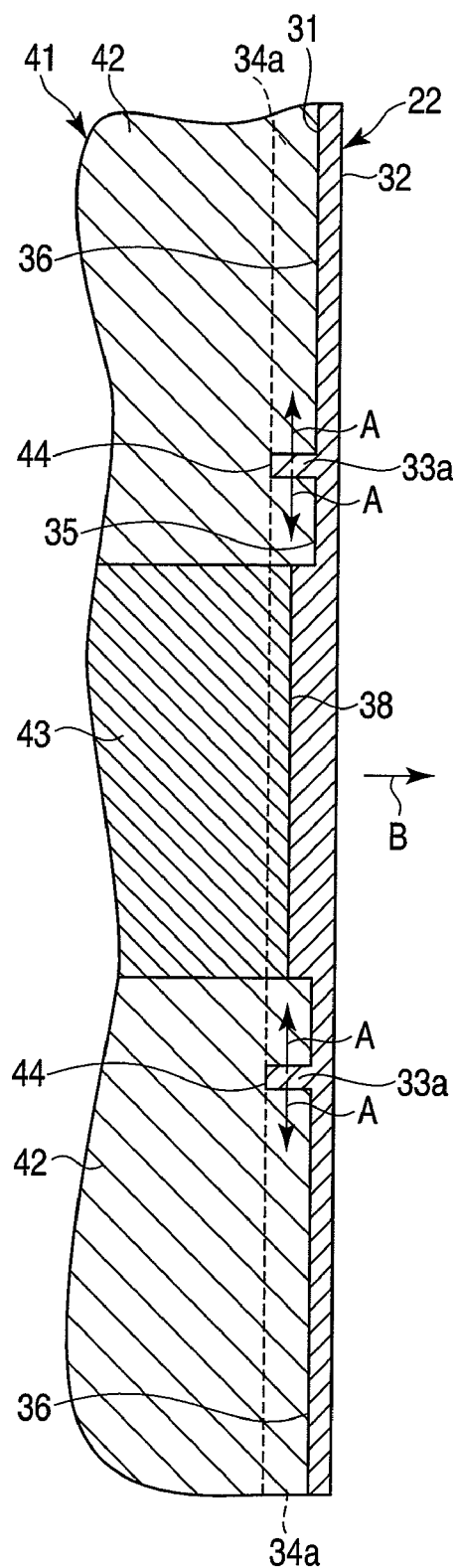
FIG. 6 is an exemplary cross sectional view showing the exterior cover shown in FIG. 1 and a die-casting device.

FIG. 6 is a cross sectional view showing the exterior cover 22 and the die-casting device 41 employed to manufacture the exterior cover 22. The die-casting device 41 includes a metal mold 42 for forming the exterior cover 22 and a plurality of push-out pins for removing the exterior cover 22 from the metal mold 42. In the metal mold 42, a groove 44 of a honeycomb shape used to form the first to third ribs 33, 34 and 37 is made.

The die-casting device 41 further includes a column and a temperature adjusting circuit. The column and temperature adjusting circuit are mounted to the metal mold 42. The column is provided so as to maintain the stiffness of the metal mold 42, and the temperature adjusting circuit controls the temperature of the metal mold 42.

The plurality of push-out pins 43 pushes the first sections 35, respectively, when the exterior cover 22 is removed from the metal mold 42. Each of the push-out pins 43 is arranged to face the projection portion 38 of the exterior cover 22 while detouring the column and the temperature adjusting circuit. The push-out pin 43 is formed to have a circular cylindrical shape. The push-out pin 43 moves to project from the metal mold 42. The diameter of the push-out pin 43 is set smaller than the diameter of the projection portion formed into a circular cylindrical shape.

The exterior cover 22 having the above-described structure is manufactured by the die-casting device 41 in the following manner. That is, molten metal is injected to the metal mold 42 in which the groove 44 is formed, and thus the exterior cover 22 is formed. The exterior cover 22 contracts as the temperature decreases from immediately after the completion of the injection of the molten metal.

The first and second ribs 33 and 34 formed by the groove 44 of the metal mold 42 tightly attaches to the metal mold 42 as the cover contracts such as to hold to the groove 44 towards the arrow A shown in FIG. 6. For this reason, while the exterior cover 22 is being removed from the metal mold 42 towards the direction indicated by the arrow B shown in FIG. 6, there is created a strong frictional force between the exterior cover 22 and the metal mold 42.

FIG. 7 is a perspective view showing the exterior cover 22 and the push-out pin 43 while omitting the metal mold 42. As can be seen in FIG. 7, the projection portion 38 is pushed towards the direction incited by the arrow C in FIG. 7 as it receives the push-out pin 43.

FIG. 8 is a cross sectional view showing the exterior cover and the push-out pin 43 taken along the line F8-F8 in FIG. 4. The projection portion 38, when it is pushed by the push-out pin 43 towards the direction incited by the arrow C, slightly sinks into the inner wall surface 31 towards the direction incited by the arrow D in FIG. 8. As the projection portion 38 sinks, the third rib 37 integrated with the projection portion 38 as one unit is pulled in the direction incited by the arrow E in FIGS. 7 and 8 towards the projection portion 38.

As can be seen in FIG. 8, the third rib 37 and the second rib 34 are continued to each other in a linear manner, the second rib 34 is pulled in the direction incited by the arrow E. That is, as shown in FIG. 7, a total of 6 of each of the second ribs 34 and the third ribs 37 are pulled towards the sinking projection portion 38. In this manner, the force applied from the push-out pin 43 to the projection portion 38 is dispersed to 6 of each of the second ribs 34 and the third ribs 37 being pulled towards the projection portion 38.

As the projection portion 38 is further pushed by the push-out pin 43 in the direction indicated by the arrow C, the exterior cover 22 is removed from the metal mold 42. After removed from the metal mold 42, the exterior cover 22 is subjected to finishing such as coating, and thus the exterior cover 22 is completed.

Next, the effect of the portable computer 1 having the above-described structure will now be described.

As can be seen in FIG. 2, the first rib 33 and the second rib 34 which collaborate together to form the so-called honeycomb structure are integrated with the inner wall surface 31 as one unit. With this structure, the exterior cover 22 can be formed thin, light in weight and highly stiff.

Further, as shown in FIG. 8, when the projection portion 38 is pushed by the push-out pin 43, the projection portion 38 pulls the third rib 37 and the second rib 34. In this manner, the force applied from the push-out pin 43 to the projection portion 38 while the exterior cover 22 is removed from the metal mold 42 is dispersed.

Since the force applied to the projection portion 38 is dispersed, the projection portion 38 only slightly sinks when pushed by the push-out pin 43. Therefore, the decorative surface 32, which is located on an opposite side to the inner wall surface 31, maintains its shape which has been formed with the metal mold 42. In this manner, the deformation of the exterior cover 22 which may occur when removed from the metal mold 42, can be prevented.

Moreover, since the deformation which may occur when removed from the metal mold 42 can be prevented, the exterior cover 22 can function also as a decorative cover. Thus, the number of parts can be decreased, and further the exterior cover 22 can be made further thin and light in weight.

It should be noted here that in this embodiment, the plurality of third ribs 37 extend radially from the projection portion 38 towards the respective corners of the first sections 35; however the plurality of third ribs are not limited to this structure. It is alternatively possible that, for example, the third ribs 37 extend radially from the projection portion 38 towards 3 of the 6 corners of the first sections 35.

Further, in this embodiment, the height of the projection portion 38 projecting from the inner wall surface 31 is set to a half of the height of the first to third ribs 33, 34 and 37; however the projection portion is not limited to this structure. It is alternatively possible that, for example, the height of the projection portion 38 is set to be equal to the height of the first to third ribs 33, 34 and 37 when the frictional force acting between the first and second ribs 33 and 34 and the metal mold 42 is large.

Next, the second embodiment of the present invention will now be described with reference to FIG. 9. In the second embodiment, structural parts which have the same functions as those of the portable computer 1 of the first embodiment will be designated by the same reference numerals, and the explanations therefor will be omitted.

FIG. 9 is a perspective view showing the exterior cover 22 and the push-out pin 43 while omitting the metal mold 42. As can be seen in FIG. 9, a rib 51 is integrated with the inner wall surface 31 as one unit. The rib 51 includes a plurality of frame parts 51a.

The rib 51 has an arrangement of the so-called honeycomb structure, and defines a plurality of sections 52. Each of the sections 52 is defined as substantially a regular equilateral hexagonal shape by three pairs of frame parts 51a facing each other.

In the inner wall surface 31, a plurality of projection portions 53 are integrated with the rib 51 as one unit. As shown in FIG. 9, each of the projection portion 53 project from the inner wall surface at locations where frame parts 51a intersect each other. Each projection portion 53 is formed to have a circular cylindrical shape across three sections 52 adjacent to each other. The projection portion 53 is pushed by the respective push-out pin 43 when the exterior cover 22 is being removed from the metal mold 42. The height of the projection portion 53 projecting from the inner wall surface 31 is set lower than the height of the rib 51. For example, the height of the projection portion 53 projecting from the inner wall surface 31 is set to a half of the height of the rib 51.

When the exterior cover 22 is being removed from the metal mold 42, the projection portion 53 is pushed by the push-out pin 43 towards the direction incited by the arrow C in FIG. 9. When the projection portion 53 is pushed by the push-out pin 43, it slightly sinks into the inner wall surface 31. As the projection portion 53 sinks, the rib 51 integrated with the projection portion 53 as one unit is pulled in the direction incited by the arrow E in FIG. 9 towards the projection portion 53. In this manner, the force applied to the projection portion 53 from the push-out pin 43 is dispersed over the rib 51 pulled towards the projection portion 53.

According to the portable computer 1 having the above-described structure, the force applied to the projection portion 53 from the push-out pin 43 when removing the exterior cover 22 from the metal mold 42 is dispersed. In this manner, as in the case of the first embodiment, the deformation of the exterior cover 22 can be prevented.

It should be noted that the present invention is not limited to the embodiments described above, but it can be modified into various versions within the scope where the essence of the present invention remains when practicing the invention. For example, the arrangement of the rib provided in the inner wall surface is not limited to the honeycomb structure which defines a plurality of sections each having substantially a regular equilateral hexagonal shapes, but it may be a lattice structure which defines sections of a rectangular shape.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a housing comprising an exterior cover, the exterior cover comprising an inner wall surface facing an inside of the housing;
   a first rib integrated with the inner wall surface as one unit, and arranged to define a plurality of first sections therein;
   a second rib integrated with the inner wall surface and the first rib as one unit, and arranged to define a plurality of second sections therein;
   a plurality of projection portions projecting from the inner wall surface, each of the plurality of projection portions being integrated with the inner wall surface and located within a respective one of the plurality of first sections; and
   the projection portions are configured to be pushed by push-out pins for removing the exterior cover from a mold; and
   third ribs connecting the first rib and the projection portions, respectively, the third ribs being continuous to the second ribs, respectively; and the second sections surround the first sections; each of the projection portions is located at a central portion of each respective one of the plurality of first sections; and the plurality of third ribs radially extend from the projection portions, respectively, and project from the inner wall surface further than the projection portions.

2. The electronic device of claim 1, wherein the third ribs extend radially from the respective one of the projection portions towards the respective first rib.

3. The electronic device of claim 2, wherein each of the first sections is surrounded by a plurality of second sections.

4. The electronic device of claim 3, wherein each of the projection portions is located at a central portion of the respective one of the first sections.

5. The electronic device of claim 4, wherein a height of the projection portions projecting from the inner wall surface is lower than a height of the third rib.

6. The electronic device of claim 5, wherein each of the projection portions has a circular cylindrical shape.

7. The electronic device of claim 6, wherein:
the exterior cover is formed with a metal mold comprising push-out pins, and
the projection portions receive the push-out pins, respectively and have a diameter larger than that of the push-out pins.

8. The electronic device of claim 1, wherein:
the first rib comprises a plurality of first frame portions;
the second rib comprises a plurality of second frame portions; and
each of the first sections is defined by three pairs of the first frame portions which face each other, and each of the second sections is defined by three pairs of the second frame portions which face each other.

9. The electronic device of claim 1, wherein the projection portions each have a circular cylindrical shape.

10. The electronic device of claim 9, wherein the projection portions each have a diameter larger than that of push-out pins for detaching the exterior cover from a metal mold.

11. The electronic device of claim 1 further comprising a display panel housed in the housing,
wherein the housing comprises an interior cover and the exterior cover,
the display panel being disposed between the interior cover and the exterior cover.

12. The electronic device of claim 1, wherein the exterior cover is formed by die-casting.

13. The electronic device of claim 1, wherein each of the first sections is formed to have substantially an equilateral hexagonal shape by the first rib.

14. The electronic device of claim 1, wherein each of the second sections is formed to have substantially an equilateral hexagonal shape by the second rib.

15. The electronic device of claim 1, wherein the number of the first sections is less than the number of the second sections.

16. The electronic device of claim 1, wherein
the corners of the first rib which define the first section are formed continuous to the respective second rib,
the third ribs are formed linearly continuous to the respective second rib continuing to the respective first rib.

* * * * *